Dec. 31, 1929.  W. C. SCHNEIDER  1,741,251
STARTER MOTOR DRIVE
Filed April 25, 1928
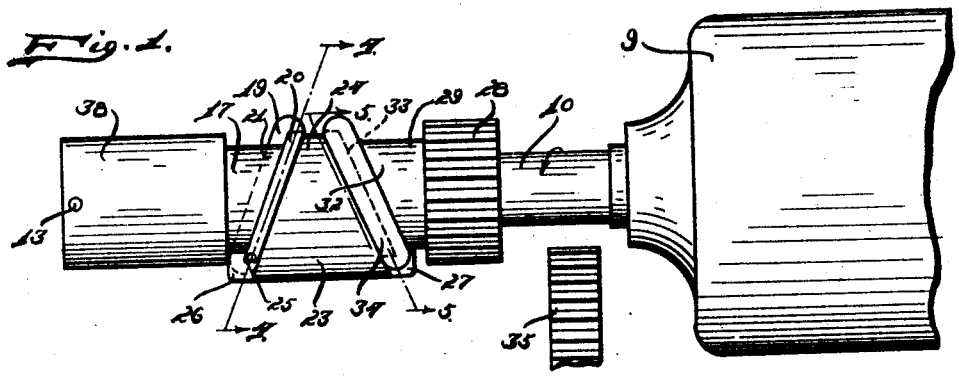
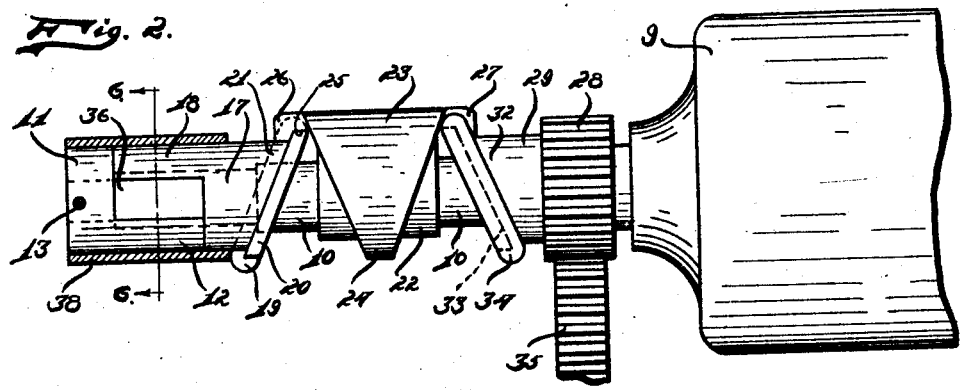
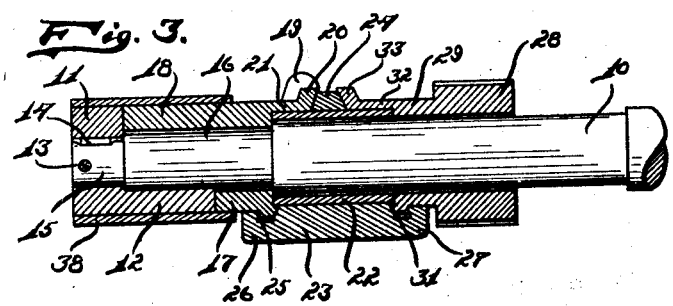
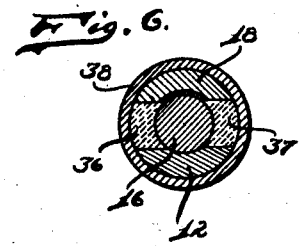
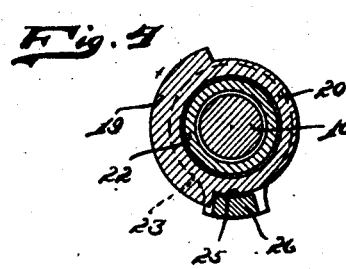
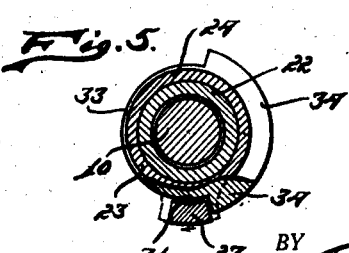
INVENTOR.
Walter C. Schneider.
BY
ATTORNEY.

Patented Dec. 31, 1929

1,741,251

UNITED STATES PATENT OFFICE

WALTER C. SCHNEIDER, OF DETROIT, MICHIGAN

STARTER MOTOR DRIVE

Application filed April 25, 1928. Serial No. 272,648.

My invention relates to a new and useful improvement in a starter motor drive adapted for use on motor starters and intended to establish connection between the rotating shaft of the starter and the rotating part of the motor.

It is an object of the present invention to provide a drive of this kind which will be simple in structure, economical of manufacture, durable and highly efficient in use.

Another object of the invention is the provision of a starter drive in which there is a positive action on the moving parts, thus assuring efficient operation of the device at all times, and eliminating the difficulty commonly encountered where a spring action is relied upon.

Another object of the invention is the provision of yieldable engaging members for transmitting the rotating motion of the starter shaft to the drive, which will permit the dispensing with springs.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention attached to a starter motor.

Fig. 2 is a view similar to Fig. 1 with the drive moved into operative position, and with parts broken away and shown in section.

Fig. 3 is a fragmentary central longitudinal vertical sectional view of the drive.

Fig. 4 is a view taken on line 4—4 of Fig. 1.

Fig. 5 is a view taken on line 5—5 of Fig. 1.

Fig. 6 is a view taken on line 6—6 of Fig. 2.

In the drawings I have illustrated the starter motor 9 provided with a shaft 10 adapted to rotate in the direction indicated by the arrow in Fig. 1, this rotation, as illustrated in the drawings, being counter clockwise.

Embracing one end of the shaft 10 is a collar 11, projecting outwardly from which is the arcuate extension 12. A pin 13 is projected through the collar 11 and the reduced portion 15 of the shaft 10, and a key 14 serves further to bind the collar in fixed relation on the reduced portion 15. As shown in Fig. 3, the reduced portion 15 is of slightly less diameter than the reduced portion 16 of the shaft 10. Embracing the reduced portion 16 is a collar 17, extending from one side of which is the arcuate extension 18 oppositely disposed on the reduced portion 16 to the arcuate extension 12.

As clearly appears from Fig. 2 and from Fig. 3, the collars 11 and 17 may be formed from a bushing or sleeve. An extension 21 projects outwardly from the end of the collar 17, this extension terminating in an end face inclined to the axis of the collar 17. This extension 21 is provided on one side with a flange 20, and on the other side with an abutment bead or flange 19. This collar 17 is loosely mounted on the reduced portion 16. A bushing 22 loosely mounted on the shaft 10 is pressed into a circular operating member, one side 23 of which is wide and tapers to a narrow width at the apex 24, so that, extending around opposite sides of the shaft 10, will be formed triangular projections extending outwardly from the periphery of the bushing 22. The wide portion 23 of this operating member is provided with laterally projecting wings 26 and 27. Formed in the wing 26 is a groove 25 in which the flange 20 is adapted to engage and ride. Formed in the wing 27 is a groove 31. A gear 28 carries a collar 29, this gear and collar being loosely mounted on the shaft 10. Extending outwardly from the collar 29 is a portion 32 resembling the portion 21 and provided, throughout one-half of its periphery, with a flange 33, and throughout the other half, with an abutment flange or bead 34, the flange 33 engaging and riding in the groove 31.

A sleeve 38 is mounted in embracing relation on the collar 11 and the extensions 12 and 18. As shown in Fig. 2, the side edges of the extensions 12 and 18 are in spaced relation and positioned snugly between these side edges are yieldable blocks 36 and 37 preferably made from rubber, the sleeve 38 serving to retain these blocks in position between the edges mentioned.

In operation, when it is desired to rotate the wheel 35 of the engine, so as to start the same, the starter motor 9 is energized so as to rotate the shaft 10 in the direction indicated by the arrow in Fig. 1. This shaft, rotating, will carry with it the collar 11 having the extension 12 thereon. This extension 12, engaging the blocks 36 and 37, will transmit to the extension 18, the rotary motion so as to rotate the collar 17.

The parts, prior to the rotation, are in the relative position shown in Fig. 1. The collar 17, when rotated, will bring one end of the flange or bead 19 into engagement with the wing 26, this wing being an abutment member for this engaging function. Prior to the engagement of one end of the flange 19 with the swing 26, and as the collar 17 is being rotated, the member 23 will be moved axially of the shaft 10, the amount of axial movement being determined by the pitch or angle of the inclined face of the extension 21. When the bead or flange 19 engages the wing 26, the member 22 and the operating member mounted thereon will be rotated. The engagement of the flange 33 in the groove 31 will effect, as the bushing 22 and operating member mounted thereon are rotated, an axial movement of the collar 29 so as to force the pinion or gear wheel 28 into mesh with the gear on the flywheel 35. When this rotation of the bushing 22 has been effected through 180 degrees, the wing 27 will be brought into engagement with one end of the bead or flange 34 so as to effect a rotation of the collar 29 and consequently a rotation of the wheel 35. The engagement of the beads or flanges 19 with the wing 26, and the bead or flange 34 with the wing 27, serves as a means for transmitting the rotary motion to the gear 28. Consequently when the gear 27 is engaged by the flange or bead 34 there will be a sudden strain placed upon these parts, and this strain will be relieved through the functioning of the yieldable blocks 36 and 37. When the motor starts the gear 28 will be caused to race on the shaft 10, thus effecting the reverse axial movement of the collar 29 and bringing the opposite end of the flange or bead 34 into engagement with the opposite face of the gear 27, so as to effect a rotation of the bushing 22 in the opposite direction on the shaft 10, this rotation effecting, through axial movement of the collar 29 and also axial movement of the bushing 22, so that the parts will be, through this racing and rotation, part of which will be due to momentum, moved to normal or inoperative position, as shown in Fig. 1, and the gear 28 disengaged from the gear 35.

It will be noted that when these parts are moved axially of the shaft 10, that the movement is a positive one because of the engagement of the flanges in the grooves 25 and 33.

Because of the construction of the various parts an economical arrangement is provided and one which is quite durable and efficient in use.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A device of the class described, comprising: a gear axially and rotatably mounted on a shaft; a cam bearing member axially and rotatably mounted on said shaft; means connected to said cam bearing member effecting axial movement of said gear upon rotation of said cam bearing member, and axial movement of said gear upon axial movement of said cam bearing member on said shaft; means rotatable in unison with said shaft; means connecting said means to said cam bearing member and effecting axial movement of the same upon rotation of said rotatable means; and means effecting rotation of said cam bearing member upon rotation of said rotatable means a predetermined amount.

2. A drive of the class described comprising: a rotatable shaft; a gear rotatably and axially mounted on said shaft; an inclined surface bearing member projecting outwardly from one face of said gear; an inclined surface bearing member rotatable in unison with said shaft and facing and spaced from said first mentioned inclined surface bearing member; a spreader positioned between said inclined surface bearing members and movable axially and rotatively on said shaft, the movement of said spreader in either direction effecting an axial movement of said gear; means on said spreader for rotating said gear in unison therewith upon relative rotation of the same to a predetermined position; and means on said second mentioned inclined surface bearing member engageable with said spreader for effecting rotation of said spreader in unison with said shaft.

3. A drive of the class described, comprising: a rotatable shaft; a gear rotatably and axially movable on said shaft; a spreader rotatably and axially movable on said shaft; means connecting said gear and said spreader, the rotative and axial movement of said spreader relatively to said shaft effecting an axial movement of said gear relatively to said shaft; means rotatable in unison with said shaft; means connecting said last mentioned means with said spreader and effecting axial movement of said spreader on said shaft during the rotation of said last mentioned means through a predetermined distance; and means on said last mentioned means for effecting a rotation of said spreader in unison with said shaft.

4. A drive of the class described, comprising: a rotatable shaft; a gear rotatably and axially movable on said shaft; a spreader rotatably and axially movable on said shaft; a groove and projection connection at one side of said spreader connecting said spreader and said gear, said connection being inclined to the axis of said shaft; means on said spreader adapted, upon rotation of the same relatively to said gear a predetermined distance for effecting rotation of said gear in unison therewith; a driving member; a groove and projection connection between the opposite sides of said spreader and said driving member, said connection extending at an incline to the axis of said shaft; yieldable non-metallic means for transmitting rotative movement from said shaft to said driving member; and means on said driving member adapted upon rotation of the same a predetermined distance relatively to said spreader for effecting rotation of said spreader in unison therewith.

In testimony whereof I have signed the foregoing specification.

WALTER C. SCHNEIDER.